April 12, 1960
G. H. MULLER ET AL
2,932,507
MOTOR VEHICLE SUSPENSIONS
Filed Sept. 27, 1956
3 Sheets-Sheet 1
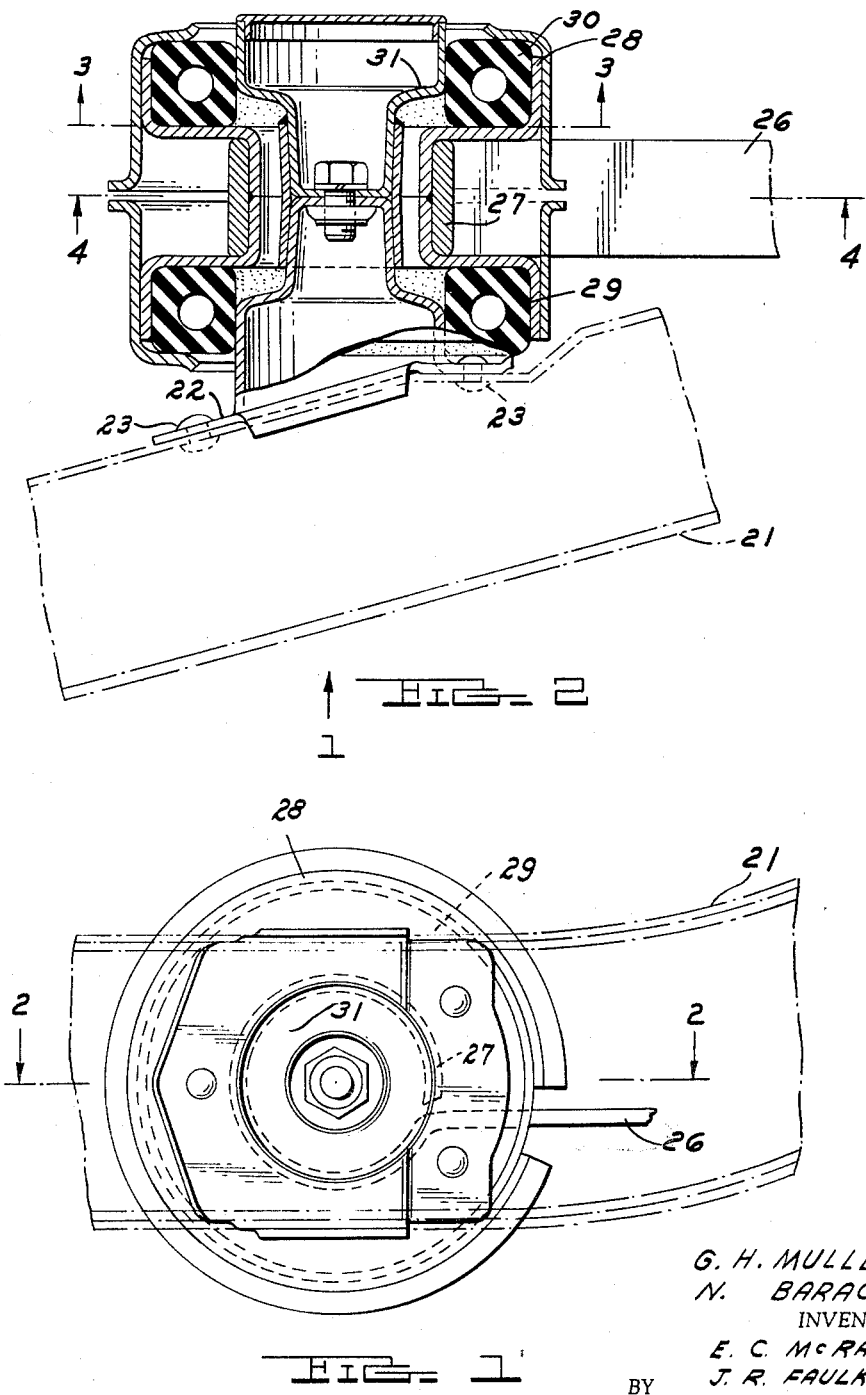
G. H. MULLER
N. BARACOS
E. C. McRAE
J. R. FAULKNER
T. H. OSTER
R. T. SEEGER
INVENTORS
BY
ATTORNEYS April 12, 1960 G. H. MULLER ET AL 2,932,507
MOTOR VEHICLE SUSPENSIONS
Filed Sept. 27, 1956 3 Sheets-Sheet 2
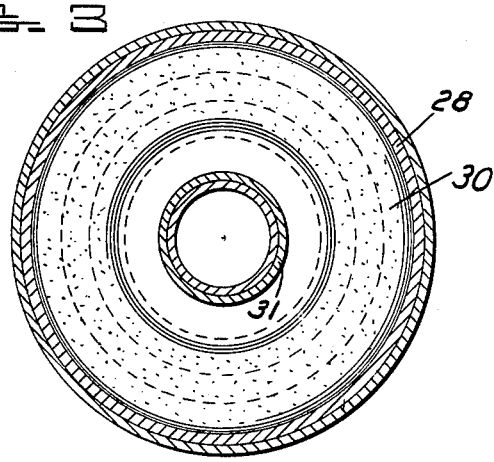
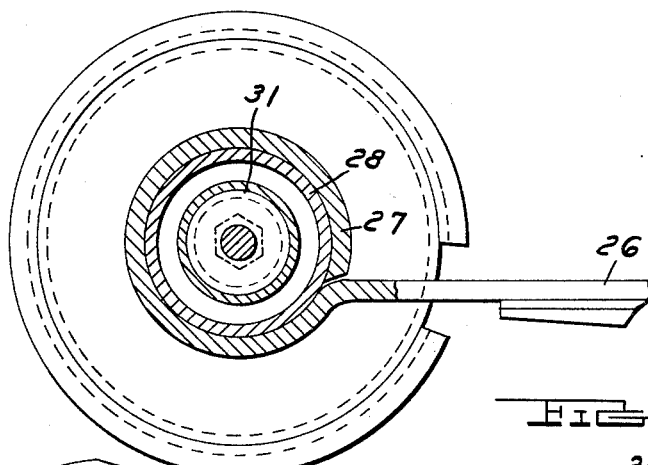
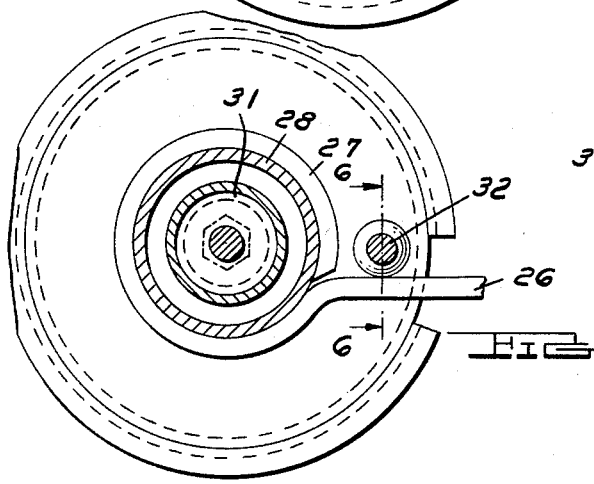
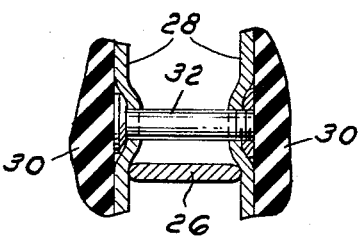
G. H. MULLER
N. BARACOS
E. C. McRAE
J. R. FAULKNER
T. H. OSTER
R. T. SEEGER
INVENTORS
BY
ATTORNEYS

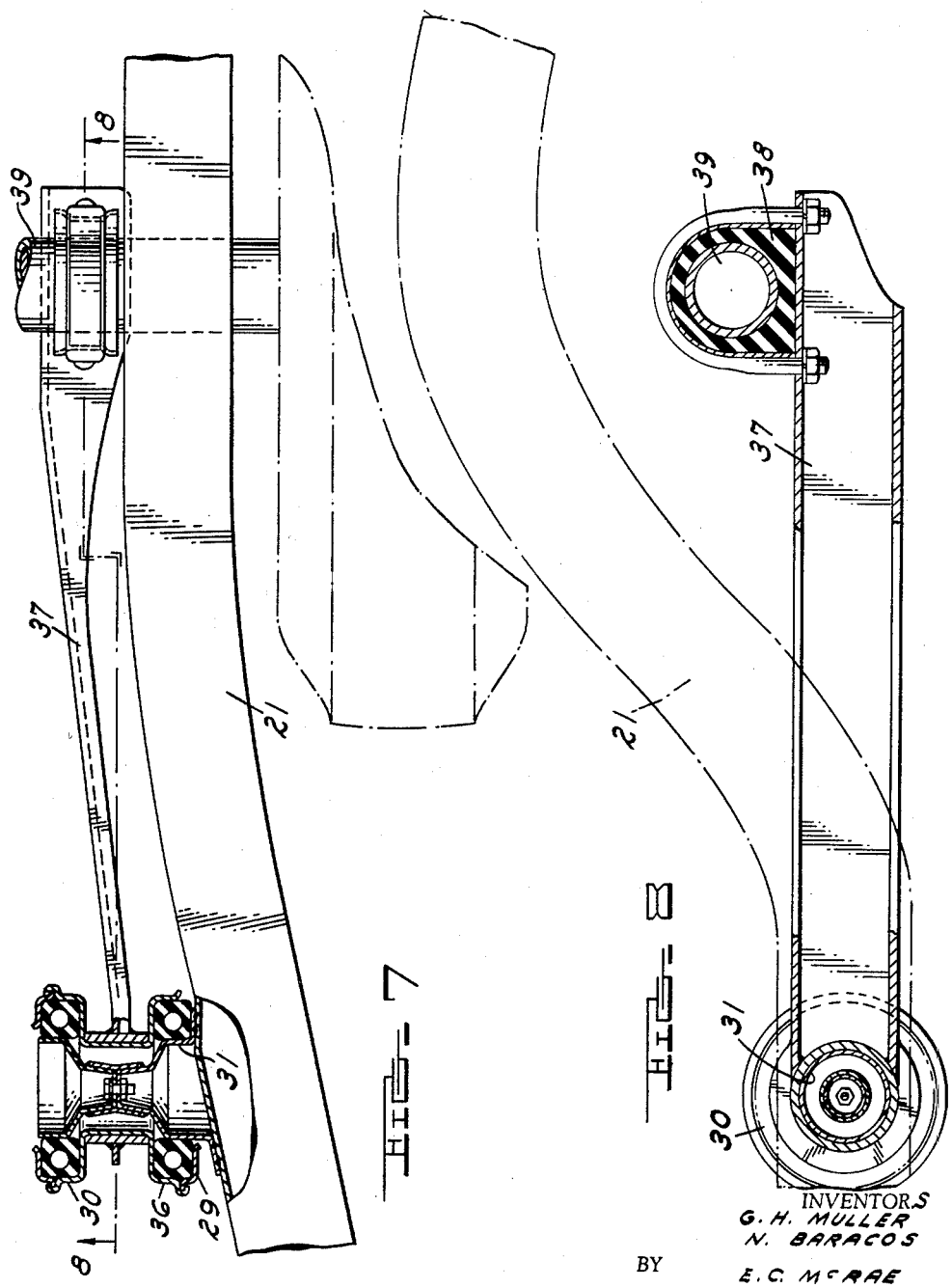

United States Patent Office 2,932,507
Patented Apr. 12, 1960

2,932,507

MOTOR VEHICLE SUSPENSIONS

George H. Muller, Northville, and Nicholas Baracos, Dearborn, Mich., assignors to Ford Motor Company, Dearborn, Mich., a corporation of Delaware Application September 27, 1956, Serial No. 612,457

3 Claims. (Cl. 267—54)

This invention relates to a motor vehicle suspension and, more particularly, to suspensions of the trailing arm and leaf spring types, usually employed at the rear end of the vehicle.

This invention provides, by means of a selective placement of elastic toroids, a suspension which offers a softer, quieter ride, and one which decreases spring stresses by reducing spring wind-up and spring roll or twist. A conventional way to mount leaf springs to the motor vehicle frame in the so called Hotchkiss drive is to provide the top leaf with an eye portion at each end, through which a stud is placed, which stud by means of a hanger in front and a shackle, or the like, in rear is connected to a frame portion at an anchor point. In a trailing arm suspension type, the forward end of the arm is usually attached to the frame while the rearward end is attached to the wheel axle with spring means between an intermediate portion of the arm and the frame. An elastic toroid is applied at the leaf spring front eye in case of the Hotchkiss type suspension and at the arm anchor point to the car frame in case of a trailing arm suspension. This invention provides for a retainer with a centrally indented portion, with rubber toroids placed on either side of and against the indentation. The spring eye is placed snugly about said indentation and has enlarged or flared ends which fit tightly against the inner circumference of said toroids so that mounted between the spring retainer combination and the frame-mounted stud are two longitudinally parallel elastic toroids which dampen vibrations, lower the noise level, provide a softer ride, prolong spring life, and cushion driving and braking forces.

These and other advantages will become more apparent when a detailed description of a single embodiment is made which is best understood when considered with the drawings, in which:

Figure 1 is an elevational view of the plate to which the frame-mounted stud is attached with the frame shown in dash-dot lines;

Figure 2 is a section taken along 2—2 of Figure 1, showing the indented retainer with the parallel toroids and also a portion of the spring and spring eye, with the frame being shown in dash-dot lines;

Figure 3 is a section taken at 3—3 of Figure 2 showing the elevational view of a toroid relative the centrally mounted stud;

Figure 4 is a section taken at 4—4 of Figure 2 through the center of the spring, showing the spring relative the stud portion;

Figure 5 is a view similar to Figure 4, showing an alternative method of holding the spring eye solidly with retainer;

Figure 6 is a section taken at 6—6 of Figure 5, showing a bolt mounted adjacent the spring, holding the opposite walls of the retainer in the indentation firmly together;

Figure 7 shows a plan view of a cutaway, partial frame and axle assembly having a trailing arm suspension therebetween; and Figure 8 shows an elevational view of said trailing arm suspension.

Looking at Figure 1 is seen frame 21 which is shown in phantom and to which is attached mounting plate 22 by bolts 23. Also shown is spring 26 having eye portion 27 which fits about the indented ring of retainer 28. On either side of the indented ring is placed an elastic toroid 29, 30. These toroids are mounted parallel to and on either side of the eye portion 27 of the spring 26 with stud 31 extending through their centers. The ends of stud 31 are enlarged so that a tight fit is made with the inner circumference of each toroid and one end of the stud is attached to plate 22. Toroids 29, 30 may each have a small port from the inner ring of air to the outside so that when they are compressed they will quickly recover, due in part to the atmospheric pressure entering the exhausted centers. The toroids may also be pneumatically sealed with any degree of inside pressure desired.

In Figure 3 may be seen from an elevation the relation between stud 31, toroid 30, and retainer 28. In Figure 4 the eye portion 27 of spring 26 is shown encircling retainer 28 to which it is fixedly mounted and also stud 31 about which it rotates. Stud 31 may fit tightly enough against or be attached to toroids 29, 30 so that any turning between retainer 28 and stud 31 is resisted by the torsional elasticity of the toroids, thereby taking up a portion of the spring wind-up experienced on acceleration and deceleration of the vehicle. While spring 26 may be welded, press fitted, or otewise fixed to retainer 28, bolt 32, shown in Figures 5 and 6, may be used to tighten retainer walls about spring 26 to thereby aid in a secure bonding.

Looking at Figure 2, it can be seen that in almost any type of directional vibration or bounce, toroids 29, 30 will absorb a large portion of vibrational and jerk effects. During vehicle acceleration, toroids 29, 30 will cushion driving thrust thereby smoothing the forward acceleration forces. Similarly, on deceleration any abrupt brake action is cushioned in a rearward movement of the front eye of the rear spring. The insulators also laterally cushion the rear suspension when one rear wheel is negotiating an obstruction on the road surface. With this invention a non linear spring constant is possible providing a smooth but firm ride not possible with conventional spring. Normal jounces will be absorbed through the compression of the rubber in the rings 29, 30 and also of the air space therein. Also, by varying the size and conformation of the air space, a desired spring constant for rings 29, 30 is obtained.

This invention also applies to the trailing arm suspension. Elastic toroids may be mounted to that portion of the trailing arm attached to the frame as shown in Figures 7 and 8.

In Figure 7 frame 21 has attached stud 31 which is inserted through toroids 29, 30. Retainer 36 has an indented portion about which is fixed the forward portion of trailing arm 37. The rear portion of trailing arm 37 is connected through a rubber bushing 38 to rear axle 39 with a suspension or spring means (not shown) being between arm 37 and frame 21. It is seen, therefore, that vibrations developed in arm 37 are cushioned and absorbed by toroids 29 and 30 providing similar benefits afforded by these toroids with a leaf spring.

It will be understood that the invention is not to be limited to the exact construction shown and described, but that various changes and modifications may be made without departing from the spirit and scope of the invention, as defined in the appended claims.

What is claimed is:

1. In combination with a vehicle frame and a suspension member having a transversely extending eye at one end thereof, a frame attached stud having an indented center portion extending through said eye and having end portions positioned externally of said eye, a retainer having an indented center portion interposed between said stud center portion and said eye, said retainer having enlarged end portions, the external diameter of said stud center portion being sufficiently smaller than the internal diameter of said retainer center portion to provide clearance therebetween, and a pair of resilient toroids positioned one on each side of said eye externally thereof, said toroids being interposed between the end portions of said stud and retainer to resiliently maintain said suspension member end in spaced relationship to said stud.

2. In combination with a vehicle frame and a suspension member having a transversely extending eye at one end thereof, a frame attached stud having an indented center portion extending through said eye in concentric spaced relation thereto, a retainer having an indented center portion extending through said eye in abutting concentric relation to the inner surface thereof, the external diameter of said stud center portion being sufficiently smaller than the internal diameter of said retainer center portion to provide clearance therebetween, said stud and retainer being provided with spaced concentric end portions at each side of said eye externally thereof, and resilient toroids interposed between said stud and retainer end portions to resiliently maintain said suspension member end in said spaced relationship to said stud.

3. In combination with a vehicle frame and a suspension member having a transversely extending eye at one end thereof, a frame attached stud having a center portion extending through said eye, said center portion being of substantially lesser diameter than the inside diameter of said eye, a retainer having a center portion extending through said eye in abutting concentric relation to the inner surface thereof, the external diameter of said stud center portion being sufficiently smaller than the internal diameter of said retainer center portion to provide clearance therebetween, said stud and retainer being provided with annular flange portions at each side of said eye externally thereof, and resilient hollow toroids interposed between said stud and retainer annular flange portions to resiliently maintain said suspension member end in spaced relationship to said stud.

References Cited in the file of this patent

UNITED STATES PATENTS

| | | |
|---|---|---|
| 1,560,655 | Brewster | Nov. 10, 1925 |
| 1,746,217 | Jansson | Feb. 4, 1930 |
| 1,790,516 | Williams | Jan. 27, 1931 |
| 1,862,943 | Saives | June 14, 1932 |
| 1,887,666 | Van Ranst | Nov. 15, 1932 |
| 2,393,183 | Parker | Jan. 15, 1946 |
| 2,563,090 | Woolson et al. | Aug. 7, 1951 |
| 2,838,339 | Schaldenbrand | June 10, 1958 |